(12) United States Patent
Ryder et al.

(10) Patent No.: US 7,798,244 B2
(45) Date of Patent: Sep. 21, 2010

(54) PRECISION HOE OPENER WITH SWING LINK AND BIASING MEMBER

(75) Inventors: Nicholas George Alfred Ryder, Saskatoon (CA); Montgomerie Summach, Saskatoon (CA); Gerard James Gadzella, Saskatoon (CA)

(73) Assignee: CNH Canada, Ltd. (CA)

( * ) Notice: Subject to any disclaimer, the term of this patent is extended or adjusted under 35 U.S.C. 154(b) by 70 days.

(21) Appl. No.: 12/141,895

(22) Filed: Jun. 18, 2008

(65) Prior Publication Data

US 2008/0308021 A1    Dec. 18, 2008

Related U.S. Application Data

(60) Provisional application No. 60/944,790, filed on Jun. 18, 2007.

(51) Int. Cl.
| A01B 61/04 | (2006.01) |
| A01B 63/111 | (2006.01) |
| A01C 5/00 | (2006.01) |
| A01C 7/18 | (2006.01) |
| A01H 5/02 | (2006.01) |

(52) U.S. Cl. ............... 172/239; 172/260.5; 172/675; 111/62; 111/926

(58) Field of Classification Search ............ 172/407, 172/395, 239, 413, 4, 260.5, 417, 448, 423, 172/424, 427, 663, 675; 111/926, 62, 134, 111/135
See application file for complete search history.

(56) References Cited

U.S. PATENT DOCUMENTS

| 1,931,783 | A | 10/1933 | Wickes |
| 2,627,797 | A | 2/1953 | Acton |
| 2,839,851 | A | 12/1954 | Geiszler |
| 2,818,269 | A | 12/1957 | Northcote et al. |
| 3,599,728 | A | 8/1971 | Moe et al. |
| 4,326,594 | A | 4/1982 | Oka et al. |
| 4,580,507 | A | 4/1986 | Dreyer et al. |
| 4,694,759 | A | 9/1987 | Dreyer et al. |
| 4,721,048 | A | 1/1988 | Fuss et al. |
| 4,759,301 | A | 7/1988 | Thomas |
| 5,031,550 | A | 7/1991 | Neal |
| 5,161,472 | A | 11/1992 | Handy |

(Continued)

FOREIGN PATENT DOCUMENTS

AU    58706/86    12/1986

(Continued)

OTHER PUBLICATIONS

U.S. Appl. No. 12/141,881, filed Jun. 18, 2008, Applicants: Jim Henry et al.; Entitled: "Precision Hoe Opener and Packer Wheel Assembly".

(Continued)

*Primary Examiner*—Christopher J. Novosad
(74) *Attorney, Agent, or Firm*—Rebecca Henkel

(57) ABSTRACT

A precision hoe opener assembly is provided with improved accuracy of seeding as well as improved control over the opener and packer wheel assemblies. The opener assembly includes a hydraulically-driven parallel linkage assembly, a lost motion linkage, a biasing member, a ground engaging tool, and a packer wheel. The design provides improved seeding accuracy, by compensating for changes in draft force caused by changes in terrain elevation.

10 Claims, 5 Drawing Sheets

U.S. PATENT DOCUMENTS

| | | |
|---|---|---|
| 5,234,060 A | 8/1993 | Carter |
| 5,351,635 A | 10/1994 | Hulicsko |
| 5,396,851 A | 3/1995 | Beaujot |
| 5,855,245 A | 1/1999 | Gerein |
| 6,032,593 A | 3/2000 | Wendling et al. |
| 6,142,085 A | 11/2000 | Drever et al. |
| 6,986,313 B2 | 1/2006 | Halford et al. |
| 7,104,205 B2 | 9/2006 | Beaujot |
| 7,152,539 B2 | 12/2006 | Swanson |
| 7,159,523 B2 | 1/2007 | Bourgault et al. |
| 7,168,376 B2 | 1/2007 | Johnston |
| 7,261,048 B1 | 8/2007 | Hantke |
| 2007/0245938 A1 | 10/2007 | Bourgault et al. |
| 2008/0029002 A1 | 2/2008 | Sulman |
| 2008/0308024 A1 | 12/2008 | Lung et al. |

FOREIGN PATENT DOCUMENTS

| | | |
|---|---|---|
| FR | 2630286 | 10/1989 |

OTHER PUBLICATIONS

U.S. Appl. No. 12/141,891, filed Jun. 18, 2008, Applicants: Nicholas George Alfred Ryder et al.; Entitled: "Precision Hoe Opener with Swing Link Between Cylinder and Shank".

U.S. Appl. No. 12/141,904, filed Jun. 18, 2008, Applicants: Nicholas George Alfred Ryder et al.; Entitled: "Precision Hoe Opener Assembly with Adjustable Packer Wheel Location".

U.S. Appl. No. 12/141,908, filed Jun. 18, 2008, Applicants: Nicholas George Alfred Ryder et al.; Entitled: "Precision Hoe Opener with Draft Force Compensation".

Voichinskii, S.M.; Agricultural Implement depth controller; Derwent Abstract Accession No. B4505B/07, SU 599755 A (Minsk Tractor Wks) Apr. 19, 1978; abstract drawings.

PRECISION HOE OPENER WITH SWING LINK AND BIASING MEMBER

RELATED APPLICATION

This application benefits from the priority of U.S. Provisional Patent Application No. 60/944,790, entitled "Precision Hoe Opener Assembly with Swing Link and Biasing Member," filed Jun. 18, 2007, which is hereby incorporated by reference in its entirety.

BACKGROUND

The invention relates to agricultural seeders, such as hoe openers and seeding tools used in farming operations to distribute seeds into the soil.

Generally, precision hoe openers are mounted to the frame of an implement which is towed behind a tractor. These openers may include a ground engaging tool or ground opener that opens the soil, providing a seeding path for seed deposition into the soil. The ground opener is used to break the soil to enable seed deposition. After the seed is deposited, the ground engaging tool may be followed by a packer wheel that packs the soil on top of the deposited seed. The packer wheel may be rigidly mounted behind the ground engaging tool via a structural member or rear frame. Thus, the ground engaging tool and packer wheel generally move together with the same upward and downward motion. This vertical motion, somewhat independent of the implement frame, allows for more precise placement of seed in the soil.

Unfortunately, existing precision hoe openers do not adequately address the need for height variation over terrain during seeding, or for transportation when not seeding. It is generally undesirable to pull the hoe opener through soil when merely transporting the opener from one location to another. In addition, during seeding, existing openers do not provide adequate vertical motion of the opener and related assembly without compromising the load on the ground engaging tool and packer wheel. As a result, variations in the terrain can result in drastic changes in the packing force (e.g., normal force) of the packer wheel on the terrain being seeded by the opener and, also, the draft force of the terrain on the ground engaging tool. In turn, this variation in packing and ground opening force can result in non-uniform seeding depths and packing density in the terrain being seeded by the system.

The distance between the packer wheel and ground engaging tool can also affect the seeding accuracy of the opener assembly. Existing precision hoe openers have a fixed distance between the packer wheel and opener. A greater distance between the components will cause variations in the terrain to greater affect the force on the ground engaging tool or packer wheel. This will also result in non-uniform force applied to the soil by the two components, which reduces seeding accuracy. For instance, some existing precision hoe openers may employ a parallel linkage to control the location of the packer wheel and opener. One of the difficulties in using a parallel linkage is that the force at the packer wheel will fluctuate as the draft force applied to the opener displaces the linkage.

Existing precision hoe openers also require substantial force to raise the opener assembly, including the ground engaging assembly and packer wheel. This requirement results in the use of large hydraulic cylinders to raise the apparatus, due to the overall length and weight of each opener assembly. This hydraulic equipment is costly and takes resources (i.e. hydraulic power) from other portions of the tractor and seeding implement.

There is a need, therefore, for improved arrangements in precision hoe openers and seeder systems that improve the accuracy of the seeding operation. There is a particular need for a precision hoe opener configuration that applies forces to the ground engaging tool and the packing wheel to improve seeding accuracy while also increasing the mobility of the opener.

BRIEF DESCRIPTION

It should be understood that the following discussion, and specific embodiments, are presented merely to provide the reader with a brief summary of certain forms the invention might take and that these embodiments are not intended to limit the scope of the invention. Indeed, the invention may encompass a variety of aspects that may not be set forth below.

Embodiments of the present invention address the problem of inadequate vertical motion of the tool by optimizing the geometric relationship of the cylinder, parallel linkage, ground engaging tool, and packer wheel. Specifically, embodiments of the present invention allow for additional motion between the shank and cylinder by incorporating a swing link assembly between these elements. The swing link enables the cylinder to travel farther than if it were rigidly mounted to the shank providing for alternative positions as the cylinder is extended or retracted. These alternative positions allow for both additional vertical motion of the assembly and the desired loading on the opener and packer wheel.

Further, the shank and ground engaging tool may be loaded by a biasing member, such as a spring, coupled to the swing link assembly, thereby enabling retraction of the shank prior to the retraction of the remaining assembly. This enables an operator to independently retract the ground engaging tool without having to retract the entire assembly. This may be beneficial when the operator has reached the end of a row and must turn to position the tractor and precision hoe opener for the next seeding pass.

Embodiments of the present invention include draft compensation in the parallel linkage to counteract draft forces placed on the ground engaging tool during operation. Embodiments of the present invention are configured to enable the hydraulic load of the cylinder to compensate and counteract the varying draft loads on the ground engaging tool, thereby maintaining a substantially constant packing pressure on the packer wheel.

Various refinements exist of the features noted above in relation to the various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to subject matter set forth in claims.

DRAWINGS

These and other features, aspects, and advantages of the present invention will become better understood when the following detailed description is read with reference to the accompanying drawings in which like characters represent like parts throughout the drawings, wherein.

Figure 1:
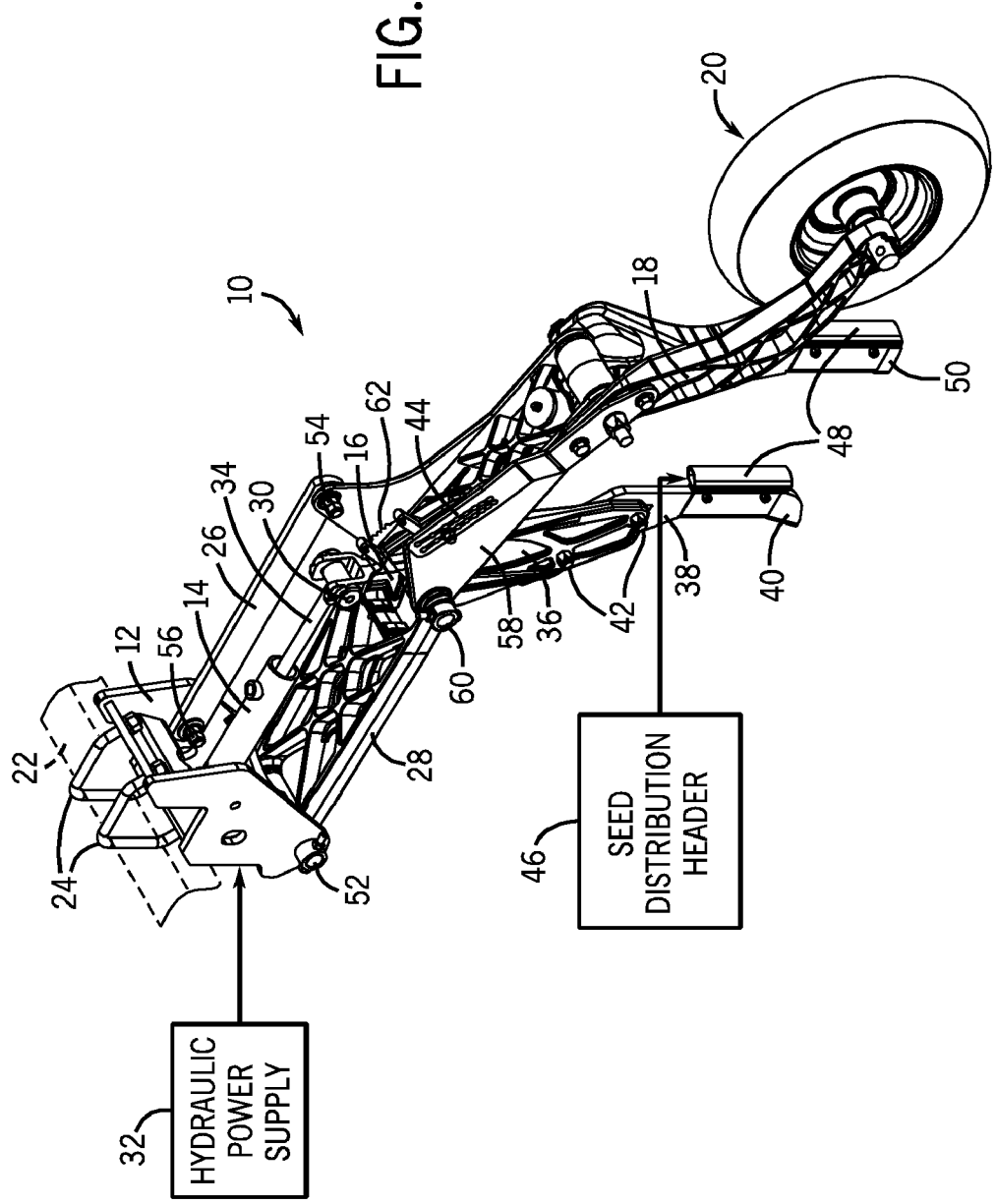
FIG. 1 is a perspective view of an embodiment of a precision hoe opener assembly having a frame support, a cylinder, a swing link assembly, a rear frame assembly, a biasing member, a ground engaging tool, and a packer wheel.
Figure 4:
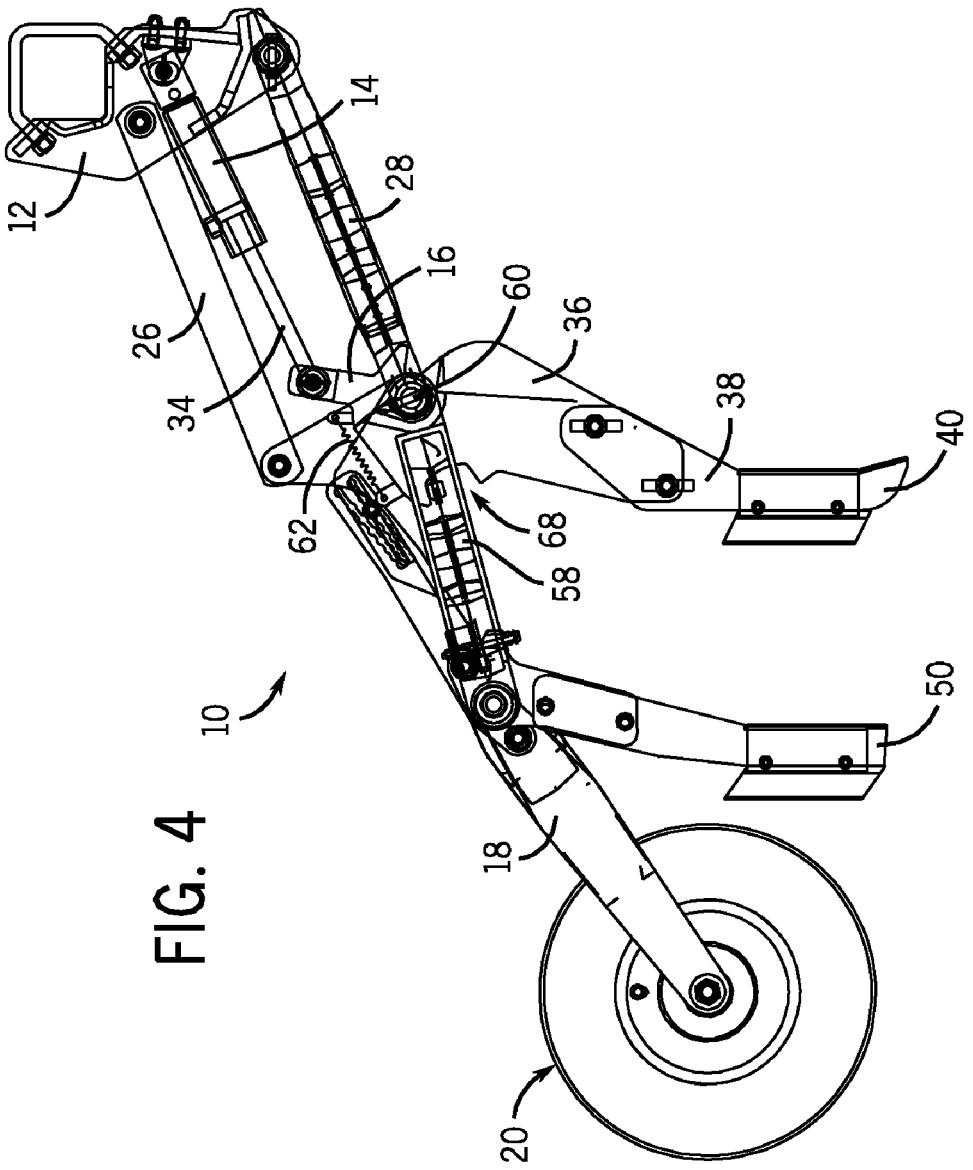
Figure 5:
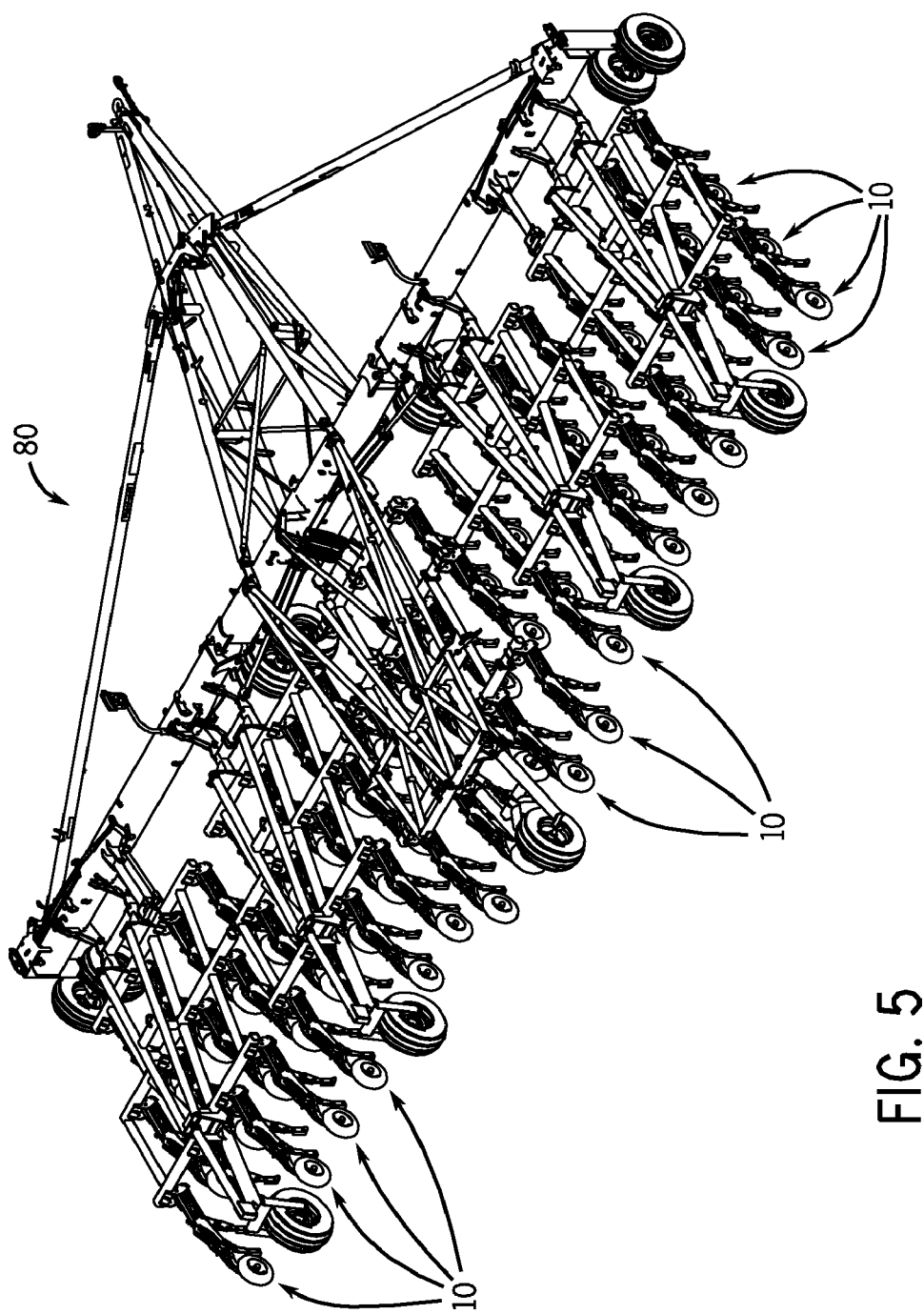

FIG. 4 is a side elevational view of an embodiment of the precision opener assembly as illustrated in FIG. 1, further illustrating a deployed operating position with draft compensation when the assembly is in this operating position; and FIG. 5 is a perspective view of an entire planter assembly system, including multiple precision hoe opener assemblies and the tool bars that they are attached thereto.

DETAILED DESCRIPTION

Turning now to the drawings and referring first to FIG. 1, an embodiment of a precision hoe opener assembly is illustrated and designated generally by reference numeral 10. Precision opener assembly 10 includes a frame support 12, a linear actuator such as a cylinder 14 (e.g. a hydraulic, piston-driven assembly), a swing link assembly 16, a packer wheel assembly 18 (e.g., a packer arm), and a packer wheel 20. Precision hoe opener assembly 10 may be towed, pushed, or generally moved by a vehicle, such as a tractor (not shown). For example, the frame support 12 may be connected to tool frame tow bar 22 attached to the tractor for towing the precision hoe opener assembly 10. The precision opener assembly 10 is mounted to the tractor support via mounting brackets 24. In the present context, the precision hoe opener assembly 10 may also be generally referred to as an opener assembly, a hoe opener, a row unit, a seeder, a planter, an opener or a ground engaging tool/assembly. Further, the ground engaging tool or opener is the portion of the hoe opener assembly that contacts the ground, thereby preparing the soil for seed deposition.

Tool frame support 12 is connected to the swing assembly 16 of packer wheel assembly 18 via the cylinder 14, first member 26, and second member 28. The mounting configuration of cylinder 14, first member 26, and second member 28 will be discussed further below. Cylinder 14 is mounted to swing link assembly 16 via pin 30. Cylinder 14 is hydraulically coupled to a power supply 32 that may be used to pressurize piston rod 34 to actuate the swing link assembly 16. Once actuated, swing link assembly 16 may engage packer wheel assembly 18 via a stop as will be described further below. The swing link assembly 16 engages the packer wheel assembly 18 via a shank mount adapter 36. The shank mount adapter 36 is coupled to a shank 38 and a first ground engaging tool 40. Shank mount adapter 36 may be coupled to shank 38 via fasteners 42, which allow height adjustments for ground engaging tool 40. Packer wheel assembly position adjustments can be made via adjuster 44. First ground engaging tool 40 is coupled to a seed distribution header 46 via a seeding tube 48 to allow product deposition during operation.

The present embodiment illustrates an optional second ground engaging tool 50, which may be added in some cases to allow for a second product to be placed in the ground. The adjustments enabled by fasteners 42 and adjuster 44 may optimize product placement accuracy by allowing packer wheel 20 to move vertically with respect to first opener 40 and second opener 50. Moreover, the optional second ground engaging tool may affect the packing forces and/or compensation of the system, but likely not significantly alter the basic design of the precision hoe opener assembly and swing link mechanism.

First member 26 is attached via pins 54, and 56 to tool frame support 12, rear frame 58, and packer wheel assembly 18. Second member 28 is connected to rear frame 58 and tool frame support 12 via pins 60 and 52. Further, pins 60 and 54 couple rear frame 58 to the packer wheel assembly 18 and shank mount adapter 36 as well as second member 28. The elements 12, 26, 28, and 58 may be collectively described as a four-bar linkage or parallel linkage assembly. As depicted, the parallel linkage assembly is driven by cylinder 14.

As discussed above, cylinder 14 actuates swing link assembly 16 to load shank 38, which further loads packer wheel assembly 18 and packer wheel 20. In certain embodiments, the packer wheel 20 provides a substantially constant force to the soil after the seed has been deposited. As is known in the art, packer wheel 20 is coupled to packer wheel assembly 18 via a rotating bearing. Further, packer wheel assembly 18 includes multiple mounting locations on adjuster 44 to allow for adjustment of the packer wheel 20. As stated above, seeding accuracy may be enhanced by adjusting the position of packer wheel 20.

In the present embodiment, shank mount adapter 36 and swing link assembly 16 are coupled by a biasing spring member 62. As will be appreciated by those skilled in the art, the biasing member may take many forms, such as a spring, an elastic band or any other suitable device. Biasing spring member 62 allows swing link assembly 16 to provide a raising force to shank mount adapter throughout the angular range of swing link assembly 16.

Figure 2:
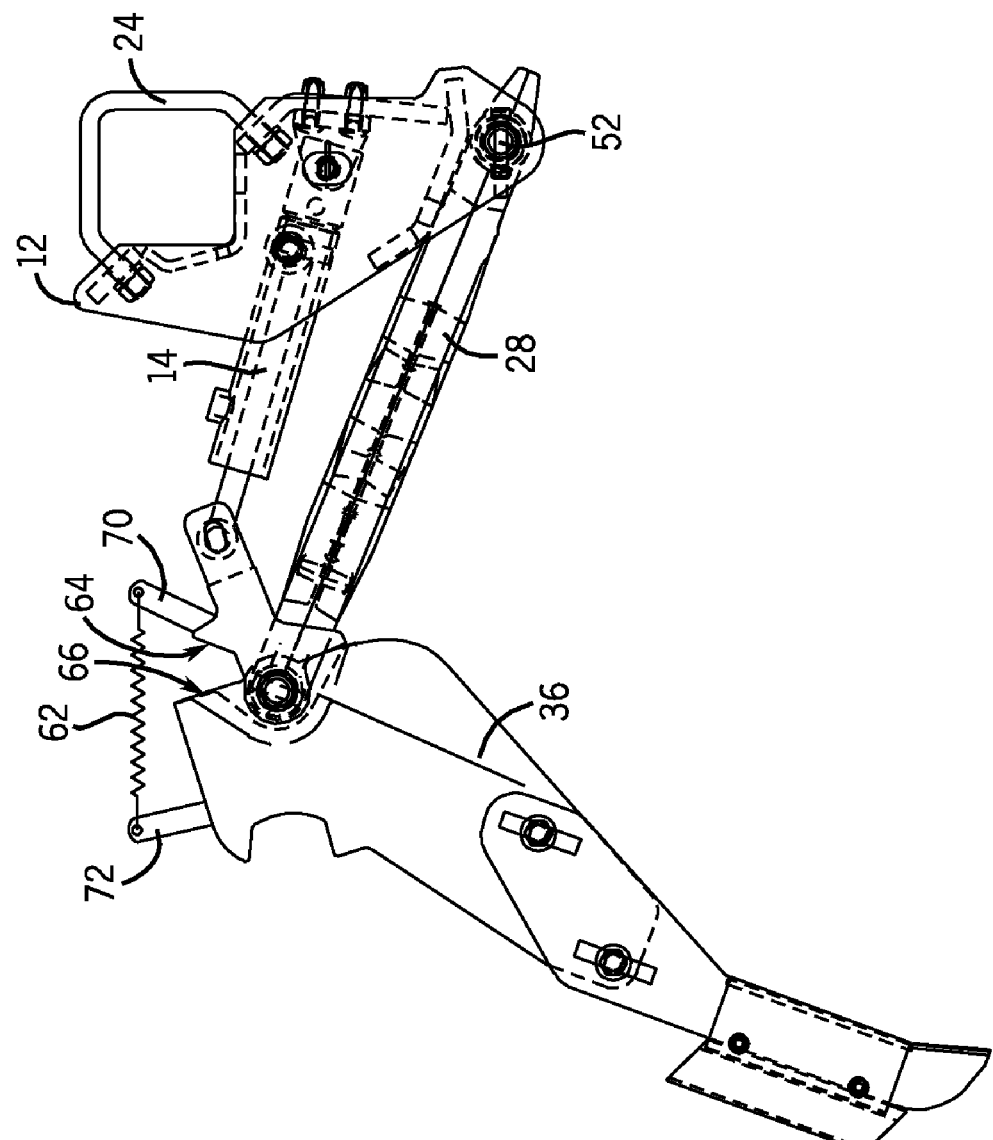
FIG. 2 is a sectional view of an embodiment of the precision hoe opener assembly of FIG. 1, wherein the packer wheel, the rear frame assembly, and certain elements have been removed for clarity.

FIG. 2 illustrates a portion of the precision hoe opener 10 with certain features removed for clarity, such as packer wheel 20, packer wheel assembly 18, and first member 26. The figure illustrates the tool frame support 12, cylinder 14, second member 28, swing link assembly 16, and shank mount adapter 36. Precision hoe opener 10 is shown with the swing link assembly 16 and first ground engaging tool 40 in a retracted position away from (and above) the ground. The cylinder 14 is retracted, thereby stretching biasing spring member 62 in tension. Further, FIG. 3 is a perspective view of the shank mount adapter 36, swing link assembly 16, and their related elements.

Figure 3:
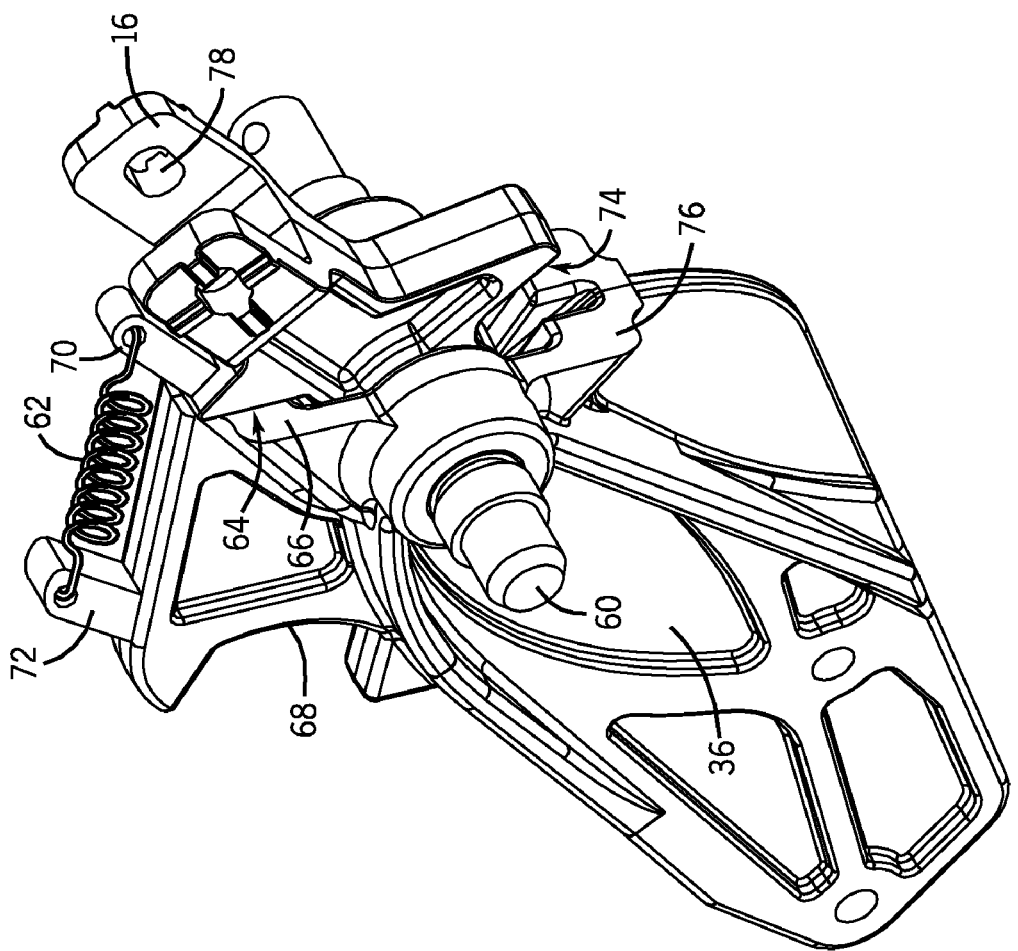
FIG. 3 is a perspective view of an embodiment of the shank mount adapter, the swing link assembly, the biasing member, and associated features as shown in FIG. 2.

Referring to both FIGS. 2 and 3, shank mount adapter 36 includes a main body having a number of features. These features interface the swing link assembly 16 during either retraction or extension of the cylinder 14. The swing link assembly includes extension mating feature 64 that interfaces with extension contact surface 66. These features provide greater leverage about pin 60 for cylinder 14, reducing the amount of hydraulic power needed to move the opener assembly. The swing link assembly 16 may be described as contacting the surfaces of shank mount adapter 36 at the extremities of the angular rotational movement of the swing link assembly 16 in order to raise or lower the shank. Further, when in the extension position, as shown in FIG. 3, frame stop cavity 68 rotates as well, engaging a frame stop, located on the rear frame, to provide a lowering force upon the packer wheel assembly. It follows, that when the swing link assembly 16 is in a retraction position, as shown in FIG. 2, the frame stop may provide a lifting force to the packer wheel assembly.

As swing link assembly 16 retracts, shown in FIG. 2, biasing spring member 62 is stretched while providing a lifting force to shank mount adapter 36. Biasing spring member 62 is attached to members 70 and 72, which are rigidly coupled to swing link assembly 16 and shank mount adapter 36, respectively. As will be appreciated by one skilled in the art, a portion of the angular movement of the swing link assembly 16 will not cause movement of the packer wheel assembly. This is due to the "stretching" of spring member 62 that is necessary to initiate a lifting force. This characteristic may cause the swing link assembly 16 to be referred to a lost motion linkage.

FIG. 3 shows the swing link assembly 16 in the extension position to engage the shank mount adapter 36 to extend the first ground engaging tool 40 and packer wheel assembly 18. In this position, extension mating feature 64 engages extension contact surface 66. Also shown are retraction mating feature 74 and retraction contact surface 76. In the present embodiment, the geometry of swing link assembly 16 reduces the required lengths for members 26 and 28 necessary to raise and lower opener assembly 10. In order to move the opener assembly 10, cylinder 14 is attached to the swing link assembly 16 via cylinder adapter 78.

Referring back to FIG. 2, the swing link assembly 16 is shown in the retracted position in which the first ground engaging tool 40 is lifted higher than the packer wheel 20. In the illustrated retracted position, retraction mating feature 74 engages retraction contact surface 66. As shown in FIGS. 2 and 3, the cylinder 14 and piston rod 34 are not directly coupled to shank mount adapter 36. Instead, the first ground engaging tool 40 is retracted and extended via the swing link assembly 16 engaging and disengaging the shank mount adapter 36.

Further, biasing spring member 62 enables retraction of shank mount adapter 36 via connection members 70 and 72. This configuration may enable optimization of the geometry for the seeding operation by enabling an operator to retract the shank mount adapter 36 without further raising the packer wheel assembly 18. For example, when an operator approaches the end of a row, that operator may retract only the first ground engaging tool 40 in order to make a turn to seed the next row. In other words, the operator does not have to retract the entire precision hoe assembly 10 and packer wheel 20 because the biasing spring member 62 raises shank mount adapter 36 before retraction mating feature 74 and surface 76 are engaged.

FIG. 4 illustrates an embodiment of the precision hoe opener 10 in a deployed position as might be representative of being towed during a seeding operation. In this deployed position, shank mount adapter 36 rotates about pin 60, along with frame stop cavity 68, to lower first ground engaging tool 40 and engage the frame stop located on rear frame 58. When shank mount adapter 36 rotates about pin 60 and engages frame stop cavity 68, shank mount adapter 36 loads packer wheel assembly 18 which is coupled to rear frame 58. The resulting force applies a load to packer wheel 20 via the parallel linkage assembly.

In general, the figures illustrate that the precision opener assembly 10 has an increased range of motion providing a generally constant packing force to the soil. This is achieved by the opener assembly 10 maintaining a substantially constant angle between packer wheel assembly 18 and terrain in combination with the geometry of cylinder 14, first member 26, and second member 28.

The disclosed embodiments of the precision hoe opener assembly 10 provide precision control of the packing force by the packer wheel 20 and the seeding depth by the first ground engaging tool 40. The opener assembly 10 advantageously responds to variations in the terrain, the draft force on the first ground engaging tool 40, the packing force, or a combination thereof. Thus, the opener assembly 10 can provide a generally uniform packing force and seeding depth to improve the overall quality of the seeding process, and in turn improve subsequent growth originating from the seeds. Again, the hoe opener assembly 10 has a variety of adjustment mechanisms to control the location of the packer wheel 20, the first ground engaging tool 40, the optional second ground engaging tool 50, or a combination thereof.

Finally, FIG. 5 illustrated the precision hoe opener assemblies 10 as row units of a complete agricultural seeder system 80, as towed behind a tractor. As shown in the diagram, the seeder system 80 includes a plurality of opener assembly row units mounted on several tool frame bars which are generally transverse to the direction the seeder system is pulled. As the seeder system 80 is towed across a field with the row units deployed, a plurality of rows of crops may be seeded in each pass.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system comprising:
a support structure;
a ground engaging assembly extending from the support structure;
a lost motion linkage cooperatively contacting the support structure to raise the ground engaging assembly after movement of the lost motion linkage through a desired angular range, wherein the lost motion linkage does not move the ground engaging assembly while the lost motion linkage moves through the desired angular range; and
a biasing member coupled to the ground engaging assembly and to the lost motion linkage for urging raising of the ground engaging assembly before the lost motion linkage moves through the desired angular range.

2. The system of claim 1, wherein the support structure includes a shank adapter, the ground engaging assembly being rigidly mounted to the shank adapter.

3. The system of claim 2, wherein the lost motion linkage is pivotally mounted to the shank adapter.

4. The system of claim 3, wherein the lost motion linkage contacts the shank adapter at two extremities of the angular range.

5. The system of claim 2, comprising a packer wheel assembly extending from the support structure aft of the ground engaging assembly, the packer wheel assembly being raised by contact with the shank adapter.

6. The system of claim 2, comprising a linear actuator coupled to the support structure and to the lost motion linkage and configured to raise and lower the ground engaging assembly by pivotal movement of the lost motion linkage.

7. The system of claim 6, wherein the biasing member is elastically coupled to the lost motion linkage and to the shank adapter and is configured to continuously assist the linear actuator in raising the ground engaging assembly.

8. The system of claim 1, wherein the support structure includes a parallel linkage assembly for raising and lowering the ground engaging assembly.

9. The system of claim 8, comprising a packer wheel assembly extending from the support structure, wherein the parallel linkage assembly is configured to maintain a substantially constant orientation of the packer wheel assembly with respect to the ground.

10. The system of claim 1, comprising a plurality of opener row units, each including the support structure, the ground engaging assembly, the lost motion linkage, and the biasing member.

* * * * *